US011139560B2

(12) United States Patent
Liu et al.

(10) Patent No.: US 11,139,560 B2
(45) Date of Patent: Oct. 5, 2021

(54) BASE STATION ANTENNA AND END COVER ASSEMBLY AS WELL AS ASSEMBLING METHOD AND DISASSEMBLING METHOD THEREOF

(71) Applicant: CommScope Technologies LLC, Hickory, NC (US)

(72) Inventors: Maosheng Liu, Jiangsu (CN); ZhaoHui Liu, Jiangsu (CN); PuLiang Tang, Jiangsu (CN); Ruixin Su, Jiangsu (CN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/878,679

(22) Filed: May 20, 2020

(65) Prior Publication Data

US 2020/0381808 A1 Dec. 3, 2020

(30) Foreign Application Priority Data

May 31, 2019 (CN) ......................... 201910465819.8

(51) Int. Cl.
*H04B 1/38* (2015.01)
*H01Q 1/24* (2006.01)
*H01Q 1/42* (2006.01)

(52) U.S. Cl.
CPC ............... *H01Q 1/246* (2013.01); *H01Q 1/42* (2013.01)

(58) Field of Classification Search
CPC .......... H01Q 1/246; H01Q 1/405; H01Q 1/42; H01Q 13/0266
See application file for complete search history.

(56) References Cited

U.S. PATENT DOCUMENTS

| | | | | |
|---|---|---|---|---|
| 2014/0227027 | A1* | 8/2014 | Berger | H01Q 1/42 403/336 |
| 2015/0325907 | A1* | 11/2015 | Goetz | H01Q 1/28 343/713 |
| 2016/0308286 | A1 | 10/2016 | Schmutzler et al. | |
| 2017/0301983 | A1* | 10/2017 | Renilson | H01Q 15/16 |

FOREIGN PATENT DOCUMENTS

| | | |
|---|---|---|
| CN | 208622940 | 3/2019 |
| WO | 2017/030939 | 2/2017 |

* cited by examiner

*Primary Examiner* — Tuan Pham
(74) *Attorney, Agent, or Firm* — Myers Bigel, P.A.

(57) ABSTRACT

The present invention relates to an end cover assembly for a base station antenna, comprising: an end cover (3) having a bottom plate, wherein the bottom plate has a through hole (7); an electrical connector (4) having a flange (10), wherein the electrical connector is configured to be received in the through hole. The geometry of the through hole and the geometry of the flange are configured such that the flange can be inserted from an exterior of the end cover and through the through hole, and the flange is capable of abutting against an inner surface of the bottom plate adjacent an inner edge of the through hole inside the end cover, wherein the flange is securable to the bottom plate at a predetermined position of the flange relative to the through hole when the flange abuts against the inner surface. The present invention further relates to a base station antenna comprising the end cover assembly, as well as an assembling method and a disassembling method for the end cover assembly. The risk of falling off of the electrical connector may be reduced, and the electrical connector can be removed more easily.

16 Claims, 5 Drawing Sheets

BASE STATION ANTENNA AND END COVER ASSEMBLY AS WELL AS ASSEMBLING METHOD AND DISASSEMBLING METHOD THEREOF

RELATED APPLICATION

The present application claims priority from and the benefit of Chinese Patent Application No. 201910465819.8, filed May 31, 2019, the disclosure of which is hereby incorporated herein in its entirety.

FIELD OF THE INVENTION

The present invention relates to the field of radio communications, and more particularly to an end cover assembly for a base station antenna, a base station antenna comprising the end cover assembly, as well as an assembling method and a disassembling method of the end cover assembly.

BACKGROUND OF THE INVENTION

A mobile communication network comprises a large number of base stations, which include respective base station antennas for receiving and transmitting communication signals. Conventionally, a base station antenna has a radome having an open end that may be enclosed by an end cover. Antenna elements are received within the radome. The antenna elements may be, for example, a reflector plate, a feeder plate, an array of radiating elements extending outwardly from the reflector plate, and the like. Electrical connectors may be mounted on the end cover. The electrical connectors may be, for example, coaxial connectors such as 4.3-10 connectors, AISG connectors, or other connectors.

Conventionally, an end cover may be made of metal. However, particularly in the era of 5G communications, the antenna elements may be very sensitive. The metal end plate having a large area may have a negative impact on the performance of the base station antenna, for example in aspects of passive intermodulation (PIM), return loss, and isolation performance. Thus, in some embodiments of the prior art, the end cover may also be partially or completely made of plastic.

Conventionally, an electrical connector may have a circumferential flange, and the bottom plate of the end cover may have circular through holes for receiving electrical connectors. In some embodiments, the electrical connectors may be secured with their flanges on the outer side of the bottom plate of the end cover. In other embodiments, the electrical connectors may be secured with their flange on the inside of the bottom plate of the end cover.

In the operation of the base station antenna, the base station antenna may be affected by the external environment. When a flange of an electrical connector is secured to the outside of the bottom plate of the end cover, especially when the end cover is made of a plastic material, fastening elements for fastening the flange might be released under the effect of a long-term load, and thus it is possible that the electrical connector is released from the bottom plate of the end cover, which is unacceptable.

In the production of base station antennas, a small number of assembled base station antennas might require rework. The base station antennas might require maintenance or repair during operation. Rework, maintenance or repair associated with a single electrical connector is very costly when the flange of the electrical connector is secured to the inside of the bottom plate of the end cover. In some cases, the electrical connector may be reached by removing the radome. In some cases, even if the radome is removed, the electrical connector can only be reached with difficulty, or even still cannot be reached.

For the related prior art, refer to for example the publication documents CN208622940U, US2016/0308286A1 and WO2017/030939A1.

SUMMARY OF THE INVENTION

Before the prior art, an object of the present invention is to provide an end cover assembly for a base station antenna, a base station antenna comprising the end cover assembly, as well as an assembling method and a disassembling method for the end cover assembly, wherein the risk of an electrical connector falling off of a bottom plate of the end cover is reduced, and the electrical connector can be removed from the assembled base station antenna more easily.

According to a first aspect of the present invention, there is provided an end cover assembly for a base station antenna, the end cover assembly comprising:

an end cover having a bottom plate, wherein the bottom plate has a through hole;

an electrical connector having a flange, wherein the electrical connector is configured to be received in the through hole;

wherein the geometry of the through hole and the geometry of the flange are configured such that the flange can be inserted from an exterior of the end cover and through the through hole, and the flange is capable of abutting against an inner surface of the bottom plate adjacent an inner edge of the through hole inside the end cover, wherein the flange is securable to the bottom plate at a predetermined position of the flange relative to the through hole when the flange abuts against the inner surface of the bottom plate adjacent the inner edge of the through hole.

In the case of the end cover assembly according to the present invention, the electrical connector may rest with its flange on the inner side of the bottom plate of the end cover, and fastening elements for fastening the electrical connector on the bottom plate may be less affected by the external environment and may be less loaded, so that the risk of the electrical connector falling off is reduced. In addition, the mounting of the electrical connector on the end cover and dismounting of the electrical connector from the end cover may be performed in an assembled state of the base station antenna without disassembling the end cover of the base station antenna from the radome.

In some embodiments, the flange may include a plurality of flange sections spaced apart from each other in a circumferential direction.

In some embodiments, the through hole may have an inner contour complementary to an outer contour of the flange, wherein the through hole includes a plurality of recesses corresponding to the flange sections that are spaced from each other in the circumferential direction, and projections between the recesses.

In some embodiments, the flange may include three or four flange sections that are evenly spaced apart from each other in the circumferential direction.

In some embodiments, the flange may have a plurality of first receiving holes, and the bottom plate may have a plurality of second receiving holes on an edge of the through hole, wherein at a predetermined position of the flange relative to the through hole, each of the first receiving holes is aligned with one of the second receiving holes, and the first and second receiving holes are configured to receive a plurality of fastening elements.

In some embodiments, the flange may have one first receiving hole in each flange section, and the bottom plate may have one second receiving hole in an area of each projection of the through hole, wherein at a predetermined position of the flange relative to the through hole, each of the first receiving holes is aligned with one of the second receiving holes, and the first and second receiving holes are configured to receive a plurality of fastening elements.

In some embodiments, the fastening elements may be screws, push rivets or expansion plugs.

In some embodiments, the fastening elements may be screws, and the first receiving holes may be threaded holes.

In some embodiments, the bottom plate may have at least one stop element in the circumferential direction on the inner edge of the through hole.

In some embodiments, the bottom plate may have two stop elements on both sides of each of the second receiving holes on the inner edge of the through hole, and one of the flange sections is retainable between the two stop elements at the predetermined position of the flange relative to the through hole.

In some embodiments, the end cover assembly may comprise a cover plate configured to be placed onto the electrical connector and shield the through hole outside the bottom plate.

In some embodiments, the cover plate may have a plurality of third receiving holes configured to receive the fastening elements.

In some embodiments, the bottom plate may include a plurality of the through holes, in which the respective electrical connectors are received.

In some embodiments, the bottom plate may be made of a plastic material such as fiberglass reinforced plastic or another engineering plastic.

In some embodiments, the electrical connector may have a base body, wherein the flange is an integral component of the base body.

According to a second aspect of the present invention, there is provided a base station antenna comprising a radome and antenna elements received in the radome, the radome having an open bottom end, characterized in that the base station antenna comprises an end cover assembly for a base station antenna according to a first aspect of the present invention, wherein an end cover of the end cover assembly encloses the open bottom end of the radome.

In some embodiments, the base station antenna may be a small cell antenna. In other embodiments, the base station antenna may be a cuboid base station antenna.

According to a third aspect of the present invention, there is provided a method for assembling an end cover assembly for a base station antenna, the method comprising the steps of:

providing an end cover and an electrical connector;

inserting the electrical connector with its flange from an exterior of the end cover and through a through hole in a bottom plate of the end cover;

abutting the electrical connector with its flange against an inner surface of the bottom plate adjacent an inner edge of the through hole inside the end cover, and positioning the flange at a predetermined position relative to the through hole; and securing the flange on the bottom plate.

According to a fourth aspect of the present invention, there is provided a method for disassembling an end cover assembly for a base station antenna assembled, the method comprising the steps of:

releasing a flange of an electrical connector secured to a bottom plate;

moving the electrical connector, such that the flange of the electrical connector is located at another predetermined position relative to a through hole, is and at the other relative position, the electrical a connector is insertable with its flange from the interior of the end cover through the through hole in the bottom plate of the end cover; and passing the electrical connector with its flange from the interior of the end cover through the through hole to an exterior of the end cover.

It is to be noted here that, the technical features as mentioned above and the technical features which will be mentioned below may be arbitrarily combined with each other as long as they are not contradictory to one another. All the technically feasible feature combinations pertain to technical content specifically recited in the present application.

BRIEF DESCRIPTION OF THE DRAWINGS

Next, the present invention will be described in more detail by way of specific embodiments with reference to the accompanying drawings. The schematic drawings are briefly described as follows.

DETAILED DESCRIPTION OF THE INVENTION

Figure 1:
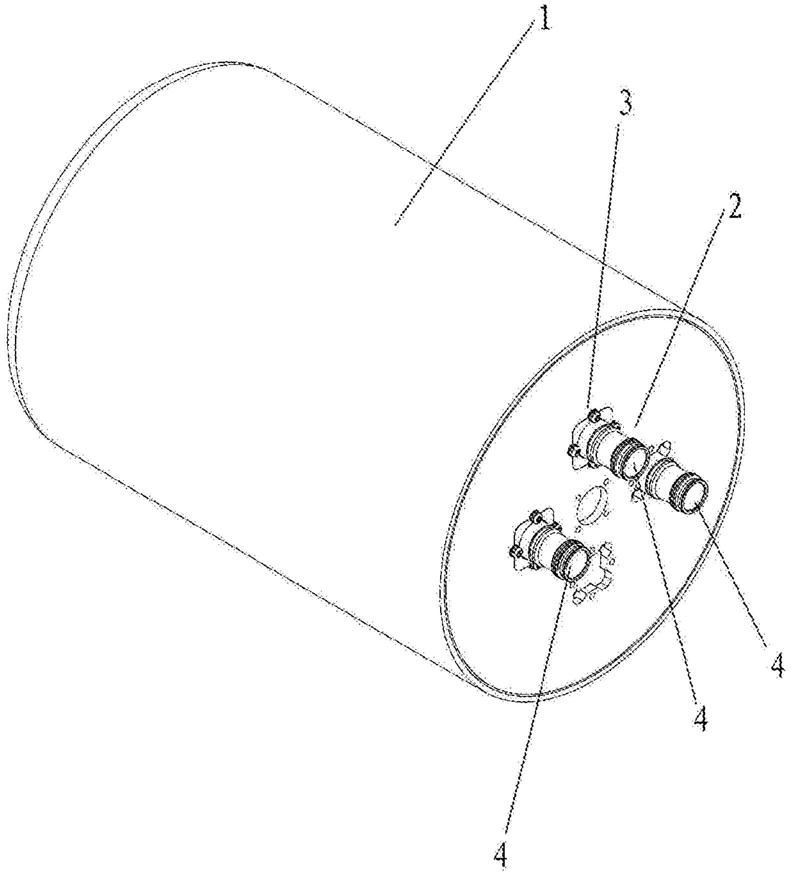
FIG. 1 is a perspective view of a base station antenna according to an embodiment of the present invention.
Figure 2:
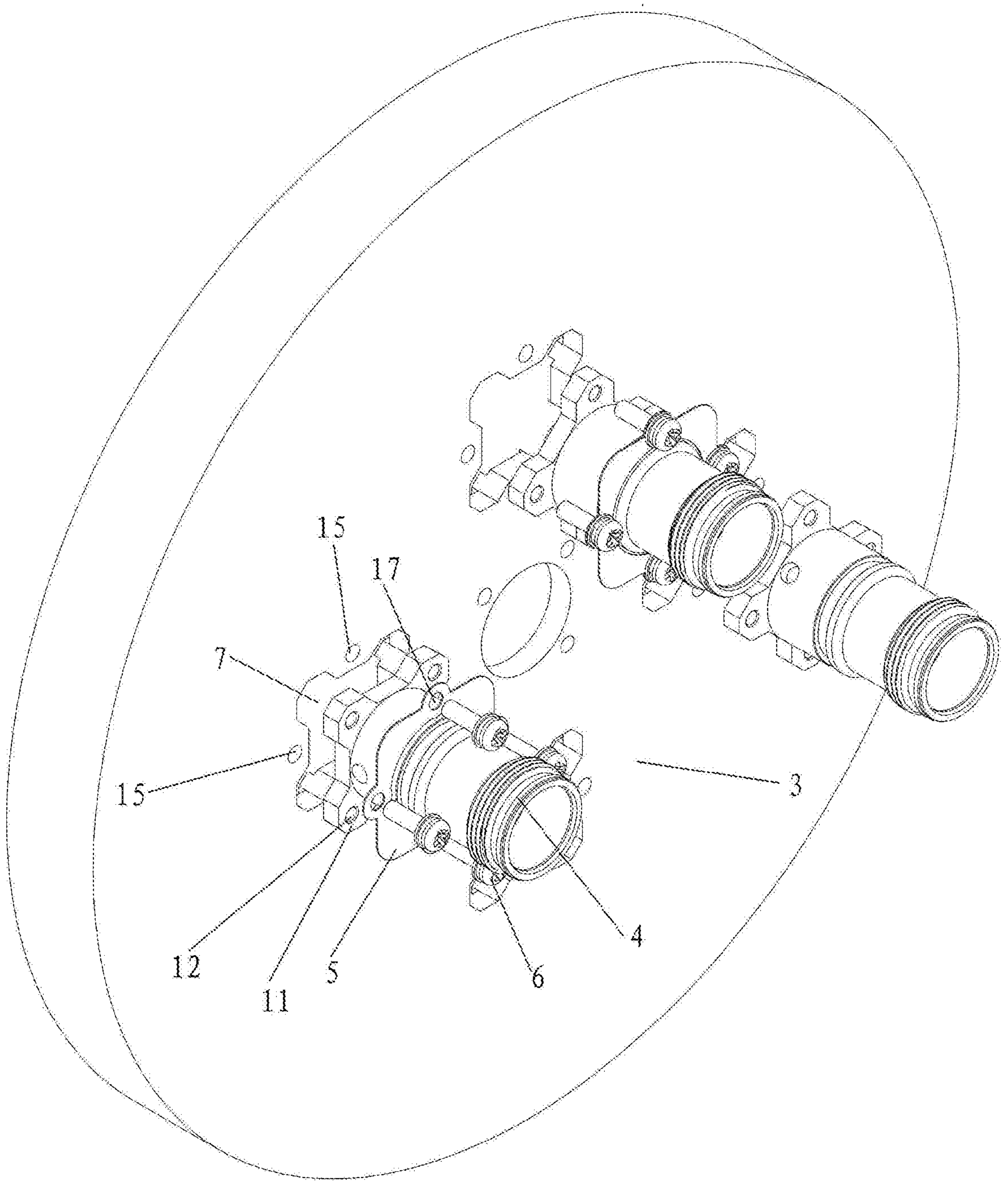
FIG. 2 is an exploded view of an end cover assembly of the base station antenna according to FIG. 1.

FIG. 1 is a perspective view of a base station antenna according to an embodiment of the present invention, and FIG. 2 is an exploded view of an end cover assembly of the base station antenna according to FIG. 1. The base station antenna comprises a radome 1, and an end cover assembly 2 that includes an end cover 3 and a plurality of electrical connectors 4 mounted on the end cover. Three electrical connectors 4 are shown in FIGS. 1 and 2. Less or more electrical connectors 4 may be provided as needed. The electrical connectors may be, for example, a coaxial connector such as a 4.3-10 connector, an AISG connector, or any other connectors. The radome 1 has an open bottom end which is enclosed by the end cover 3. Antenna elements are received within the radome 1. The antenna elements may be, for example, a reflector plate, a feeder plate, an array of radiating elements extending outwardly from the reflector plate, and the like (not shown).

Figure 3:
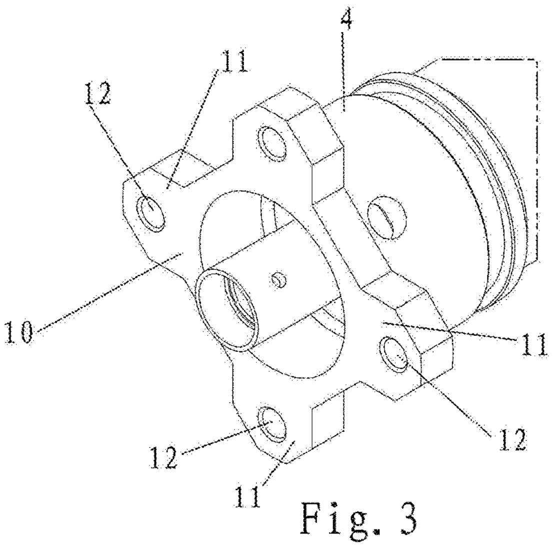
FIG. 3 is a partial perspective view of an electrical connector of the end cover assembly according to FIG. 2.

FIG. 3 is a partial perspective view of one of the electrical connectors 4 of the end cover assembly 2 according to FIG. 2. The electrical connector 4 has a flange 10 which may be formed integrally with a base body of the electrical connector 4. The flange 10 may include a plurality of flange sections 11 spaced apart from each other in a circumferential direction, wherein a first receiving hole 12 may be provided in each of the flange sections 11. In some embodiments, the first receiving hole 12 may be a threaded hole for receiving a screw. In other embodiments, the first receiving hole 12 may be a smooth hole for receiving a push rivet. In the embodiment illustrated in FIG. 3, four flange sections 11 are evenly spaced apart in the circumferential direction with a recess present between every two flange sections.

Figure 4A:
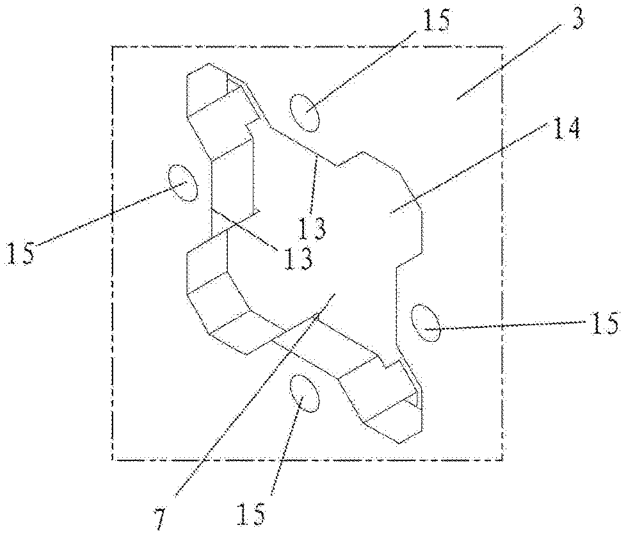
FIGS. 4A and 4B are partially enlarged perspective views of an end cover of the end cover assembly according to FIG. 2 as viewed from an exterior and from an interior.
Figure 4B:
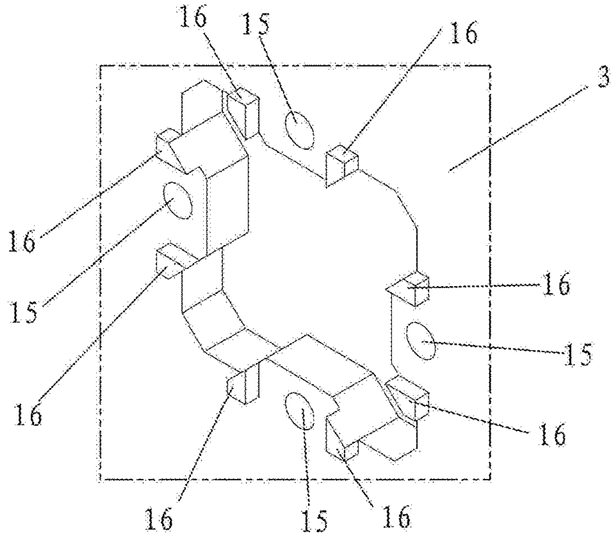

FIG. 4A is a partially enlarged perspective view of the end cover 3 of the end cover assembly 2 according to FIG. 2 as viewed from an exterior, and FIG. 4B is a partially enlarged opposite perspective view of the end cover 3 as viewed from an interior. A bottom plate of the end cover 3 is provided with a respective through hole 7 for each electrical connector 4. The through hole 7 may have an inner contour complementary to an outer contour of the flange 10, wherein the through hole 7 may include a plurality of recesses 14 corresponding to the flange sections 11 that are spaced from each other in the circumferential direction, and projections 13 between the recesses 14. A second receiving hole 15 may be provided in each of the projections 13. On an inner side of the through hole 7, two stop elements 16 may be provided on both sides of each of the second receiving holes 15 in the circumferential direction, and one of the flange sections 11 of the electrical connector 4 may be held between the two stop elements 16, such that the electrical connector 4 can be mounted on the bottom plate of the end cover 3 in an anti-rotational manner. In the embodiment shown in FIG. 4B, two stop elements 16 are provided beside each of the second receiving holes 15. However, it is also conceivable to provide one or two respective stop elements 16 beside some of the second receiving holes 15.

In the embodiment shown, the outer contour of the flange 10 of the electrical connector 4 is constructed complementarily to the inner contour of the through opening of the bottom plate of the end cover 3. However, it is also conceivable that they are not constructed complementarily. In general, the geometry of the through hole 7 and the geometry of the flange 10 are configured such that the flange 10 can be inserted from an exterior of the end cover 3 and through the through hole 7, and the flange 10 is capable of abutting against an inner edge of the through hole inside the end cover 3. The detachment of the electrical connector 4 from the end cover 3 may be done in an opposite process, wherein the electrical connector 4 can be removed from the through hole 7 at a predetermined state.

Figure 5A:
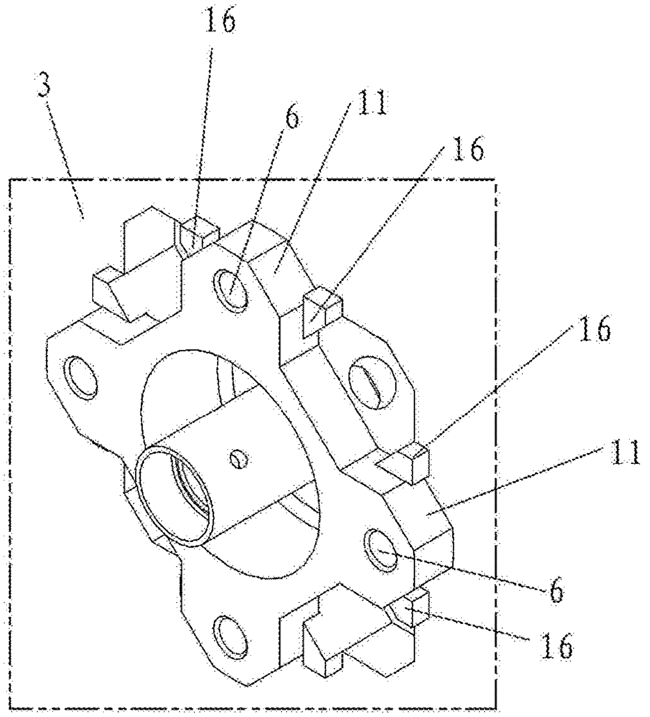
FIGS. 5A and 5B are partially enlarged perspective views of the end cover assembly according to FIG. 2 in an assembled state as viewed from an interior and from an exterior.
Figure 5B:
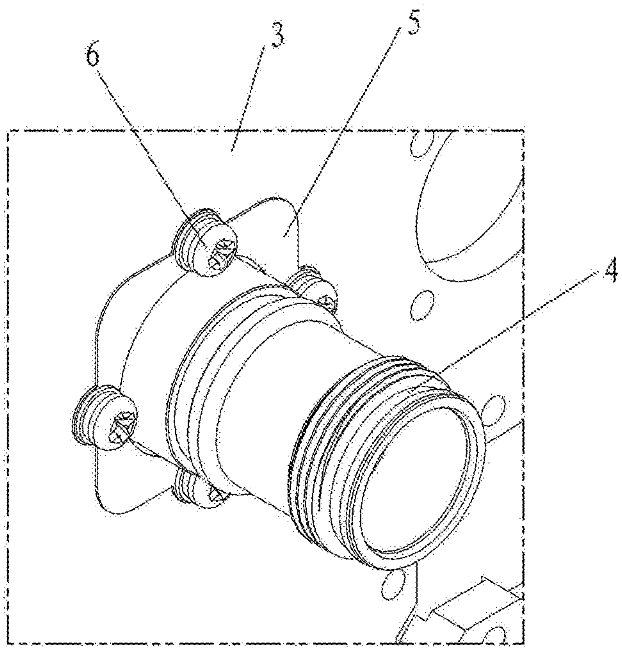

FIG. 5A is a partially enlarged perspective view of the end cover assembly 2 according to FIG. 2 in an assembled state as viewed from an interior, and FIG. 5B is a partially enlarged perspective view of the end cover assembly 2 in an assembled state as viewed from an exterior.

As shown in FIG. 5A, the flange 10 of the electrical connector 4 abuts against the inner edge of the through hole 7. More specifically, each flange section 11 abuts against the respective projection 13. Each flange section 11 is held between the respective stop elements 16 in an anti-rotational manner, and the first receiving holes 12 and the second receiving holes 15 are aligned with each other. As shown in FIG. 5B, the cover plate 5 may be placed onto the electrical connector 4, and may shield the through hole 7 from the exterior of the end cover 3. The cover plate may have third receiving holes 17 that may be aligned with the first receiving holes 12 and the second receiving holes 15. Fastening elements 6 may be received in respective receiving holes that are aligned with one another, and thus secure the electrical connector 4 to the bottom plate of the end plate 3.

The end plate assembly 2 according to the embodiment of FIG. 2 may be assembled as follows:

providing the end cover 3 and the electrical connector 4;

inserting the electrical connector 4 with its flange 10 from the exterior of the end cover 3 and through the through hole 7 in the bottom plate of the end cover 3;

rotating the electrical connector 4 by a predetermined angle relative to the end cover 3, such that each of the flange sections 11 of the electrical connector 4 is located between the respective stop elements 16 in the circumferential direction;

abutting the electrical connector 4 with its flange 10 against the inner surface of the bottom plate adjacent the inner edge of the through hole 7, wherein each of the flange sections 11 is positioned between the respective stop members 16 in an anti-rotational manner in the circumferential direction, and the first receiving hole 12 is aligned with the second receiving hole 15;

placing the cover plate 5 onto the electrical connector 4 outside the end cover 3 and resting it against the outer side of the bottom plate of the end cover 3, and aligning the third receiving holes 17 with the first receiving holes 12 and the second receiving holes 15; and passing screws 6 through the third receiving holes 17 and the second receiving holes 15 from the outer side of the bottom plate of the end cover 3 and screwing them into the first receiving holes 12 constructed as threaded holes, so that the electrical connector 4 is secured to the bottom plate of the end cover 3.

The end cover assembly 2 that has been assembled may be reversely disassembled, wherein, first, the fastening elements 6 are loosened; then, the electrical connector 4 is moved inwards along an axial direction until each of the flange sections 12 is disengaged from the stop elements 16; next, the electrical connector 4 is rotated relative to the bottom plate of the end cover 3 until the outer contour of the flange 10 is aligned with the inner contour of the through hole 7; finally, the electrical connector 4 is moved relative to the bottom plate of the end cover 3 in the axial direction until the flange 10 is removed out from the through hole 7. Thus, it is possible to operate by passing through the through hole 7 when maintenance or repair is required, or when the electrical connector 4 needs to be replaced.

Figure 6A:
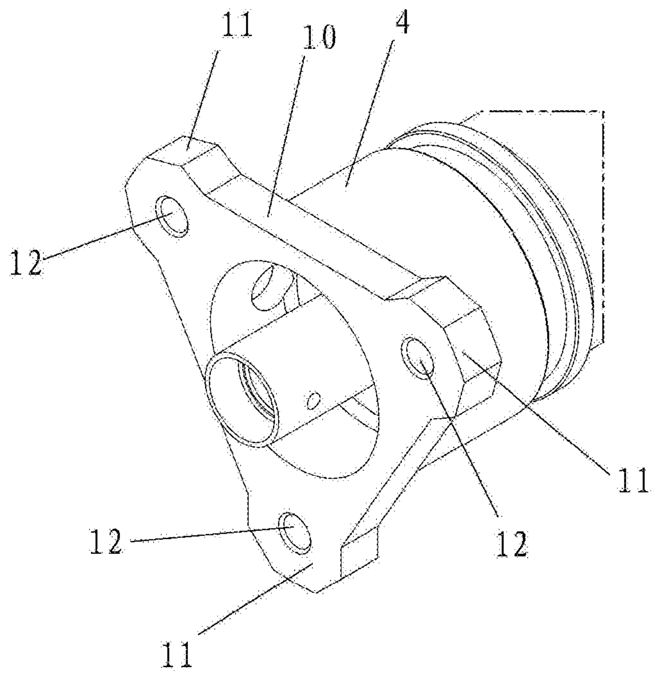
FIG. 6A is a partial perspective view of an electrical connector according to another embodiment of the present invention.
Figure 6B:
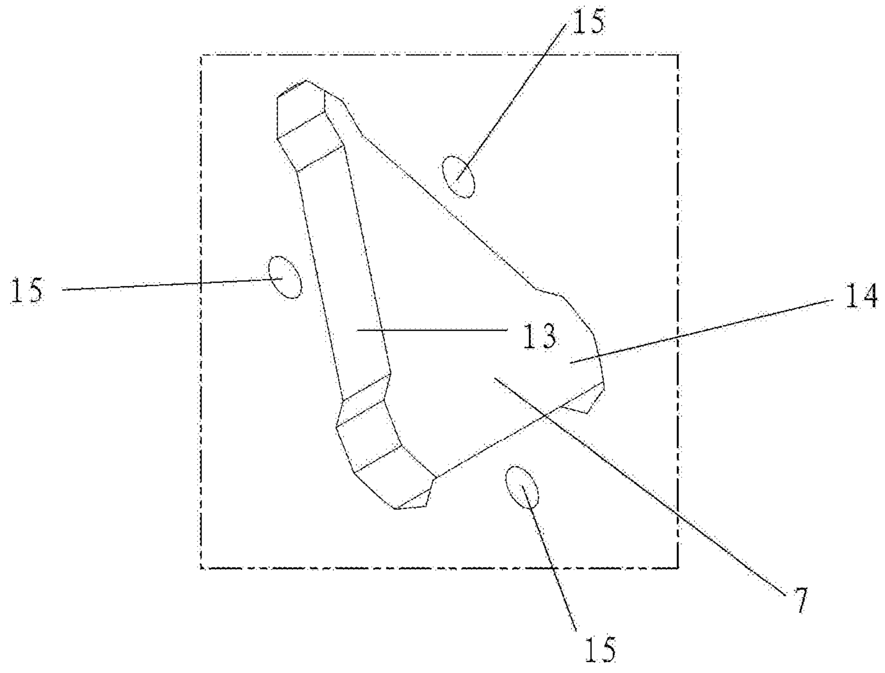
FIG. 6B is a partially enlarged perspective view of an end cover according to another embodiment of the present invention as viewed from an exterior.

FIG. 6A is a partial perspective view of an electrical connector 4 according to another embodiment of the present invention, and FIG. 6B is a partially enlarged perspective view of an end cover 3 according to another embodiment of the present invention as viewed from an exterior. The flange 10 of the electrical connector 4 according to the embodiment of FIG. 6A has three flange sections, each of which may be spaced apart from each other with 120° in the circumferential direction. The end cover 3 according to the embodiment of FIG. 6B has a through hole 7 having an inner contour complementary to the outer contour of the flange 10, wherein the through hole 7 has three recesses 14 corresponding to the flange sections that are spaced apart from each other with 120° in the circumferential direction, with projections 13 present between the adjacent recesses, wherein second receiving holes 15 are provided in the areas of the projections.

In some embodiments not shown, a flange 10 of an electrical connector 4 may have an elliptical outer contour, and a through hole 7 of a bottom plate of an end cover 3 may have an elliptical inner contour complementary thereto. The flange 10 may be inserted from an exterior of the end cover 3 and through the through hole 7 in the case where the outer contour is aligned with the inner contour, then may be rotated with 90°, and next abutted against an inner edge of the through hole 7, and finally may be secured to the bottom plate of the end cover 3 by fastening elements. The disassembling process may be carried out reversely.

In some embodiments not shown, the flange sections 11 of the electrical connector 10 may be constructed as movable members, such as spring-loaded movable members, wherein in an initial state, the flange may have an initial radial dimension, and in a changed state, the flange may have a reduced radial dimension. Therefore, when the flange 10 needs to pass through the through hole 7, the flange 10 may be changed to the changed state.

It will be understood that, the terminology used herein is for the purpose of describing particular aspects only and is not intended to be limiting of the disclosure. As used herein, the singular forms “a”, “an” and “the” are intended to include the plural forms as well, unless the context clearly indicates otherwise. It will be further understood that the terms “comprise” and “include” (and variants thereof), when used in this specification, specify the presence of stated operations, elements, and/or components, but do not preclude the presence or addition of one or more other operations, elements, components, and/or groups thereof. As used herein, the term “and/or” includes any and all combinations of one or more of the associated listed items. Like reference numbers signify like elements throughout the description of the figures.

The thicknesses of elements in the drawings may be exaggerated for the sake of clarity. Further, it will be understood that when an element is referred to as being “on,” “coupled to” or “connected to” another element, the element may be formed directly on, coupled to or connected to the other element, or there may be one or more intervening elements therebetween. In contrast, terms such as “directly on,” “directly coupled to” and “directly connected to,” when used herein, indicate that no intervening elements are present. Other words used to describe the relationship between elements should be interpreted in a like fashion (i.e., “between” versus “directly between”, “attached” versus “directly attached,” “adjacent” versus “directly adjacent”, etc.).

Terms such as “top,” “bottom,” “upper,” “lower,” “above,” “below,” and the like are used herein to describe the relationship of one element, layer or region to another element, layer or region as illustrated in the figures. It will be understood that these terms are intended to encompass different orientations of the device in addition to the orientation depicted in the figures.

It will be understood that, although the terms “first,” “second,” etc. may be used herein to describe various elements, these elements should not be limited by these terms. These terms are only used to distinguish one element from another. Thus, a first element could be termed a second element without departing from the teachings of the inventive concept.

It will also be appreciated that all example embodiments disclosed herein can be combined in any way.

Finally, it is to be noted that, the above-described embodiments are merely for understanding the present invention but not constitute a limit on the protection scope of the present invention. For those skilled in the art, modifications may be made on the basis of the above-described embodiments, and these modifications do not depart from the protection scope of the present invention.

What is claimed is:

1. An end cover assembly for a base station antenna, the end cover assembly comprising:

an end cover (3) having a bottom plate, wherein the bottom plate has a through hole (7);

an electrical connector (4) having a flange (10), wherein the electrical connector is configured to be received in the through hole (7);

wherein, the geometry of the through hole (7) and the geometry of the flange (10) are configured such that the flange (10) can be inserted from an exterior of the end cover (3) and through the through hole (7), and the flange (10) is capable of abutting against an inner surface of the bottom plate adjacent an inner edge of the through hole inside the end cover (3), wherein the flange (10) is securable to the bottom plate at a predetermined position of the flange (10) relative to the through hole (7) when the flange (10) abuts against the inner surface of the bottom plate adjacent the inner edge of the through hole;

wherein the flange (10) includes a plurality of flange sections (11) spaced apart from each other in a circumferential direction, and the through hole (7) has an inner contour complementary to an outer contour of the flange (10), wherein the through hole (7) includes a plurality of recesses (14) corresponding to the flange sections (11) that are spaced from each other in the circumferential direction, and projections (13) between the recesses (14).

2. The end cover assembly for a base station antenna according to claim 1, wherein the flange (10) includes three or four flange sections (11) that are evenly spaced apart from each other in the circumferential direction.

3. The end cover assembly for a base station antenna according to claim 1 wherein the flange (10) has a plurality of first receiving holes (12), and the bottom plate has a plurality of second receiving holes (15) on an edge of the through hole (7), wherein at the predetermined position of the flange (10) relative to the through hole (7), each of the first receiving holes (12) is aligned with one of the second receiving holes (15), and the first and second receiving holes (12, 15) are configured to receive a plurality of fastening elements (6).

4. The end cover assembly for a base station antenna according to claim 1, wherein the flange (10) has one first receiving hole (12) in each flange section (11), and the bottom plate has one second receiving hole (15) in an area of each projection (13) of the through hole (7), wherein at the predetermined position of the flange (10) relative to the through hole (7), each of the first receiving holes (12) is aligned with one of the second receiving holes (15), and the first and second receiving holes (12, 15) are configured to receive a plurality of fastening elements (6).

5. The end cover assembly for a base station antenna according to claim 3, wherein the fastening elements (6) are screws, and the first receiving holes (12) are threaded holes.

6. The end cover assembly for a base station antenna according to claim 1, wherein the bottom plate has at least one stop element (16) in a circumferential direction on an inner edge of the through hole (7).

7. The end cover assembly for a base station antenna according to claim 4, wherein the bottom plate has two stop elements (16) on both sides of each of the second receiving holes (15) on the inner edge of the through hole, and one of the flange sections (11) is retainable between the two stop elements (16) at the predetermined position of the flange (10) relative to the through hole (7).

8. The end cover assembly for a base station antenna according to claim 1, wherein the end cover assembly comprises a cover plate (5) configured to be placed onto the electrical connector (4) and shield the through hole (7) outside the bottom plate.

9. The end cover assembly for a base station antenna according to claim 3, wherein the end cover assembly comprises a cover plate (5) configured to be placed onto the electrical connector (4) and shield the through hole (7) outside the bottom plate, wherein the cover plate has a plurality of third receiving holes (17) configured to receive the fastening elements (6).

10. The end cover assembly for a base station antenna according to claim 1, wherein the bottom plate includes a plurality of through holes (7), in which the respective electrical connectors (4) are received.

11. The end cover assembly for a base station antenna according to claim 1, wherein the bottom plate is made of a plastic material.

12. The end cover assembly for a base station antenna according to claim 1, wherein the electrical connector (4) has a base body, wherein the flange is an integral component of the base body.

13. A base station antenna comprising a radome (1) and antenna elements received in the radome, the radome having an open bottom end, wherein the base station antenna comprises an end cover assembly (2) for a base station antenna according to claim 1, wherein an end cover (3) of the end cover assembly encloses the open bottom end of the radome.

14. The base station antenna according to claim 13, wherein the base station antenna is a small cell antenna.

15. A method for assembling an end cover assembly for a base station antenna according to claim 1, the method comprising the steps of:

providing an end cover (3) and an electrical connector (4);

inserting an electrical connector (4) with its flange (10) from an exterior of the end cover (3) and through a through hole (7) in a bottom plate of the end cover (3);

abutting the electrical connector (4) with its flange (10) against an inner surface of the bottom plate adjacent an inner edge of the through hole (7) inside the end cover (3), and positioning the flange (10) at a predetermined position relative to the through hole (7); and securing the flange (10) to the bottom plate.

16. A method for disassembling an end cover assembly for a base station antenna assembled according to claim 1, the method comprising the steps of:

releasing a flange (10) of an electrical connector (4) secured to a bottom plate;

moving the electrical connector (4), such that the flange (10) of the electrical connector (4) is located at another predetermined position relative to the through hole (7), and at the other relative position, the electrical connector (4) is insertable with its flange (10) from an interior of the end cover (3) through the through hole (7) in the bottom plate of the end cover (3); and passing the electrical connector (4) with its flange (10) from the interior of the end cover (3) through the through hole (7) to an exterior of the end cover (3).

* * * * *